(12) United States Patent
Harijono et al.

(10) Patent No.: US 10,176,190 B2
(45) Date of Patent: Jan. 8, 2019

(54) DATA INTEGRITY AND LOSS RESISTANCE IN HIGH PERFORMANCE AND HIGH CAPACITY STORAGE DEDUPLICATION

(71) Applicant: SK hynix Inc., Gyeonggi-do (KR)

(72) Inventors: Indra G. Harijono, San Jose, CA (US); Yan Zhang, Milpitas, CA (US); Zhenchuan Chai, Milpitas, CA (US)

(73) Assignee: SK Hynix Inc., Gyeonggi-do (KR)

( * ) Notice: Subject to any disclaimer, the term of this patent is extended or adjusted under 35 U.S.C. 154(b) by 334 days.

(21) Appl. No.: 15/010,963

(22) Filed: Jan. 29, 2016

(65) Prior Publication Data
US 2016/0224588 A1   Aug. 4, 2016

Related U.S. Application Data

(60) Provisional application No. 62/109,418, filed on Jan. 29, 2015.

(51) Int. Cl.
| | |
|---|---|
| *G06F 7/00* | (2006.01) |
| *G06F 17/00* | (2006.01) |
| *G06F 17/30* | (2006.01) |
| *G06F 11/14* | (2006.01) |
| *G06F 3/06* | (2006.01) |

(52) U.S. Cl.
CPC ...... *G06F 17/30156* (2013.01); *G06F 3/0641* (2013.01); *G06F 11/1471* (2013.01); *G06F 17/3015* (2013.01); *G06F 17/30191* (2013.01)

(58) Field of Classification Search
CPC ......... G06F 17/30156; G06F 17/30191; G06F 17/30185; G06F 2221/0775; G06F 11/1471; G06F 11/3476; G06F 17/30368; G06F 3/0641; G06F 11/1453; G06F 17/3015; G06F 17/30159; G06F 17/30162
USPC ........................................ 707/692, 648, 672
See application file for complete search history.

(56) References Cited

U.S. PATENT DOCUMENTS

| | | | | |
|---|---|---|---|---|
| 5,724,581 | A * | 3/1998 | Kozakura | G06F 11/1448 707/674 |
| 8,719,234 | B2 | 5/2014 | Akirav et al. | |
| 8,914,595 | B1 * | 12/2014 | Natanzon | G06F 3/0641 707/610 |
| 9,183,200 | B1 * | 11/2015 | Liu | G06F 17/30008 |
| 2009/0089483 | A1 * | 4/2009 | Tanaka | G06F 3/0608 711/103 |
| 2010/0082529 | A1 * | 4/2010 | Mace | G06F 11/1435 707/609 |
| 2011/0145207 | A1 | 6/2011 | Agrawal et al. | |
| 2011/0218973 | A1 | 9/2011 | Pendlebury et al. | |
| 2012/0323864 | A1 | 12/2012 | Zhu et al. | |
| 2013/0097380 | A1 * | 4/2013 | Colgrove | G06F 17/30159 711/118 |
| 2013/0151759 | A1 * | 6/2013 | Shim | G06F 12/0246 711/103 |

(Continued)

*Primary Examiner* — David T. Brooks
(74) *Attorney, Agent, or Firm* — IP & T Group LLP

(57) ABSTRACT

A memory system for utilizing a deduplication process may include a controller, a storage media, and a non-volatile RAM including a metadata journal and a metadata cache, the metadata cache including an address table and a fingerprinting table, and the metadata journal including a plurality of transactions indicating whether a transaction is successfully written on the storage media.

12 Claims, 16 Drawing Sheets

(56) References Cited

U.S. PATENT DOCUMENTS

| | | | |
|---|---|---|---|
| 2014/0006362 A1* | 1/2014 | Noronha | G06F 3/0641 |
| | | | 707/692 |
| 2014/0047202 A1* | 2/2014 | Vellore | G06F 11/1453 |
| | | | 711/162 |
| 2014/0281361 A1* | 9/2014 | Park | G06F 3/0641 |
| | | | 711/206 |
| 2015/0205680 A1* | 7/2015 | Kimmel | G06F 12/0246 |
| | | | 707/649 |
| 2016/0259590 A1* | 9/2016 | Yoshida | G06F 3/06 |

* cited by examiner

Write Consolidation on Metadata

DATA INTEGRITY AND LOSS RESISTANCE IN HIGH PERFORMANCE AND HIGH CAPACITY STORAGE DEDUPLICATION

CROSS-REFERENCE TO RELATED APPLICATIONS

This application claims the benefit of U.S. Provisional Application No. 62/109,418 filed Jan. 29, 2015, the entire contents of which are incorporated herein by reference.

BACKGROUND

1. Field

Exemplary embodiments of the present disclosure relate to a system including a storage device and a method for managing data stored in the storage device.

2. Description of the Related Art

In a memory system or a storage system including storage devices, various data management techniques are considered for improvement of storage capacity and performance. Data deduplication is the process of eliminating duplicate copies of data and replacing them with pointers to a single copy. Deduplication typically serves two main purposes: reducing the amount of storage capacity required to store data, and reducing the network bandwidth required for performing backups or replication. Most existing deduplication schemes encounters many performance issues.

SUMMARY

Aspects of the invention include memory system for utilizing a deduplication process. The memory system may include a controller, a storage media, and a non-volatile RAM including a metadata journal and a metadata cache. The metadata cache may include an address table and a fingerprinting table and wherein the metadata journal may include a plurality of transactions indicating whether a transaction is successfully written on the storage media.

Further aspects of the invention include a method for utilizing a deduplication process. The methods may include storing an address table and a fingerprinting table as a metadata cache on a non-volatile RAM, writing a transaction among a plurality of transactions in a metadata journal, each transaction indicating whether the transaction is successfully written to a storage media, and updating, on the non-volatile RAM, the metadata journal.

Additional aspects of the invention include an apparatus. The apparatus may include a memory controller suitable for use in a non-volatile RAM including a metadata journal and a metadata cache, wherein the metadata cache includes an address table and a fingerprinting table, and wherein the metadata journal includes a plurality of transactions indicating whether a transaction is successfully written on the storage media.

DETAILED DESCRIPTION

Figure 1:
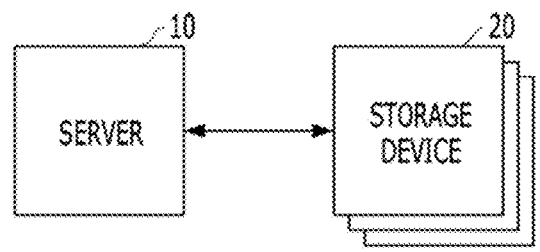
FIG. 1 is a block diagram of a storage system.

Various embodiments will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

The invention can be implemented in numerous ways, including as a process; an apparatus; a system; a composition of matter; a computer program product embodied on a computer readable storage medium; and/or a processor, such as a processor suitable for executing instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being suitable for performing a task may be implemented as a general component that is temporarily suitable for performing the task at a given time or a specific component that is manufactured to perform the task. As used herein, the term 'processor' refers to one or more devices, circuits and/or processing cores suitable for processing data, such as computer program instructions.

FIG. 1 illustrates a block diagram of a storage system or a memory system.

Referring to FIG. 1, the storage system may include a server (or memory controller) 10 and a plurality of storage devices 20. The storage devices 20 may store data, and the server 10 may control storage of data in the storage devices 20.

The storage system may operate in response to a request from a host (not shown), and in particular, store data to be accessed by the host. In other words, the memory system may be used as a main memory system or an auxiliary memory system of the host. The host may include, for example, a portable electronic device such as a mobile phone, an MP3 player and a laptop computer or an electronic device such as a desktop computer, a game player, a TV a projector, etc.

The storage devices 20 may be implemented with a volatile memory device such as a dynamic random access memory (DRAM) and a static random access memory (SRAM) or a non-volatile memory device such as a read only memory (ROM), a mask ROM (MROM), a programmable ROM (PROM), an erasable programmable ROM (EPROM), an electrically erasable programmable ROM (EEPROM), a ferroelectric random access memory (FRAM), a phase change RAM (PRAM), a magnetoresistive RAM (MRAM) and a resistive RAM (RRAM).

The storage devices 20 may be implemented with any one of various kinds of storage devices such as a solid state drive (SSD), a multimedia card (MMC), an embedded MMC (eMMC), a reduced size MMC (RS-MMC) and a micro-MMC, a secure digital (SD) card, a mini-SD and a micro-SD, a universal serial bus (USB) storage device, a universal flash storage (UFS) device, a compact flash (CF) card, a smart media (SM) card, a memory stick, and so forth.

The storage devices 20 may retain stored data when power supply is interrupted, store the data provided from the host during a write operation, and provide stored data to the host during a read operation. In some embodiments, the storage devices 20 may be non-volatile memory devices, for example, a flash memory. The storage devices 20 may include a plurality of memory blocks. Each of the memory blocks may include a plurality of pages. Each of the pages may include a plurality of memory cells to which a plurality of word lines (WL) are electrically coupled.

The server 10 may control the storage devices 20 in response to a request from the host. The server 10 may provide the data read from the storage devices 20 to the host, and store the data provided from the host into the storage devices 20. To this end, the server 10 may control overall operations of the storage devices 20, such as read, write, program, and erase operations.

In some embodiments, the server 10 may include a host interface unit for interfacing with the host, an error correction code (ECC) unit for detecting and correcting errors in the data read from the storage devices 20, a power management unit (PMU) for providing and managing power for the server 10, a memory interface between the server 10 and the storage devices 20, a memory for serving as a working memory of the server 10, and a processor for controlling general operations of the storage system.

In the storage system as described above, data management techniques such as data deduplication may be considered for improvement of storage capacity and performance. Data deduplication usually starts with comparing two pieces of data to identify duplicates. It would be impractical to compare entire data. Therefore, a hash value, also called fingerprint which is a small number generated over whole piece of data, is used to search and compare for identifying data duplicates.

As for when to perform deduplication, deduplication technology may be classified into two schemes of inline deduplication and post deduplication.

In the inline deduplication, deduplication operations such as the hashing the data, comparing the fingerprint values, and re-referencing data, are performed as the data are being written to the storage system. The advantage of the inline deduplication is that it does not need the duplicate data to actually be saved to the storage device. The disadvantage of this scheme is that significant system resources, in terms of memory and computing power, are required to perform intensive hashing calculation.

The post deduplication, instead of performing deduplication on the fly, postpones all those operations by first storing incoming data to the storage system, and deduplicating them later.

Although the post-deduplication relieves the server from heavy in-line workload, it overwhelms the server when it starts the deduplication process, which needs to rescan back all the data, and calculate the fingerprints, etc.

Figure 2:
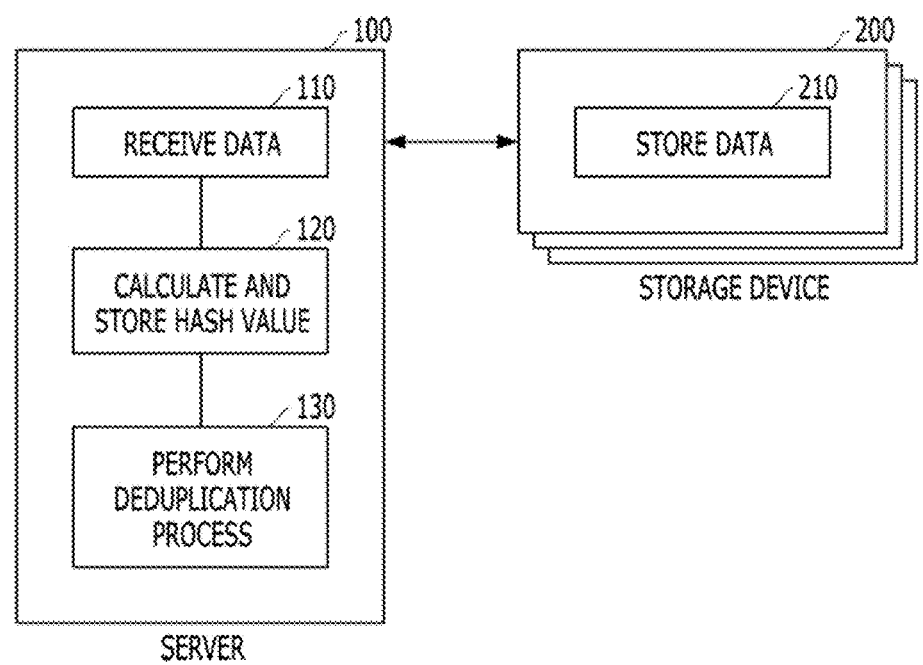
FIG. 2 is a block diagram of a storage system for a deduplication process.
Figure 3:
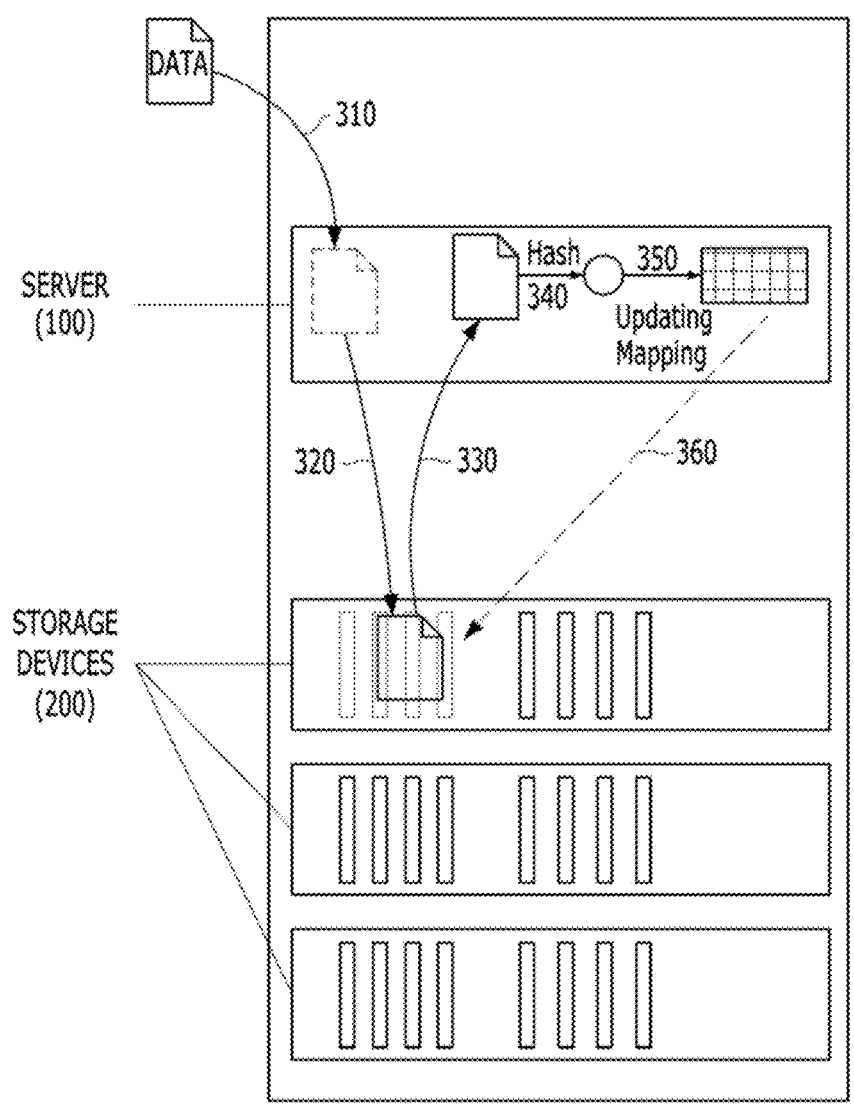
FIG. 3 is a diagram illustrating a deduplication process performed by a storage system.

For a post deduplication process, a block diagram of a storage system and a deduplication process performed by the storage system are depicted in FIG. 2 and FIG. 3, respectively.

Referring to FIG. 2, a storage system may include a server 100 and storage devices 200. For example, the server 100 and the storage devices 200 correspond to the server 10 and the storage devices 20 shown in FIG. 1, respectively.

The server 100 is responsible for handling read/write request, protocol handling, etc., while the storage devices 200 are responsible for storing data. The server 100 may include a first unit 110, a second unit 120 and a third unit 130. The first unit 110 may receive incoming data (e.g., write data) from a host (not shown). The second unit 120 may calculate and store a hash value (or fingerprint) for the incoming data. The third unit 130 may perform a deduplication process (e.g., post deduplication process). Each of the storage devices 200 may include a unit 210 for storing data received from the server 100.

Referring to FIG. 3, various steps may be performed for the post deduplication. At step 310, an incoming new data is received by the storage server 100. At step 320, the server 100 saves the incoming data to the storage devices 200. When the server 100 is scheduled to do post-deduplication, at step 330, the server 100 reads the newly saved data from the storage devices 200. At step 340, the server 100 calculates a hash value for the read data. At step 350, the server 100 looks up and updates a mapping table using the calculated hash value. The mapping table stores mapping relations between a plurality of data and a plurality of hash values. At step 350, if needed, the server 100 deletes the duplicated copy of the newly saved data in the storage devices 200.

In the steps of FIG. 3 described above, step 330 may cause a lot of data traffic within the storage system, and step 340 may need the server 100 (e.g., a central processing unit (CPU) of the server 100) to be fully occupied to calculate fingerprints.

In storage technologies, data deduplication (hereinafter referred to as "Deduplication") is a specialized data compression technique for eliminating duplicate copies of repeated data. It is sometimes referred to as single-instance (data) storage. This technique is used to improve storage utilization and can also be applied to network data transfers to reduce the number of bytes that are sent.

In the deduplication process, the writing process takes place when the user applications submit a request to write a chunk of data by specifying unique chunks of (fixed or variable length of) data, or byte patterns, and its location from which the data can be retrieved back.

Figure 4:
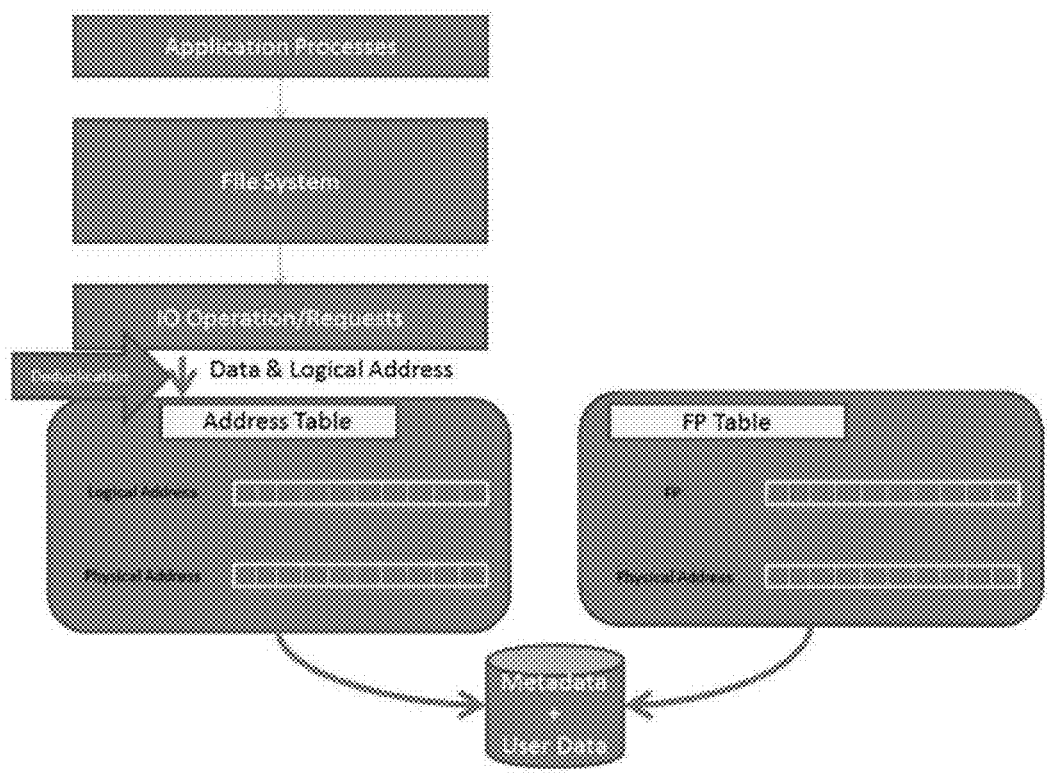
FIGS. 4 and 5 are diagrams of deduplication processes according to aspects of the invention.

Referring to FIG. 4, a diagram of an embodiment of a storage system which performs deduplication is shown. The chunks of data are identified (hereinafter the data is associated with its location referred to as "Logical Address" and the process of identifying the whole data hereinafter referred to as "Finger Printing or FP") and stored during a process of analysis. The location in the storage media where the chunks of data are really stored is identified and hereinafter referred to as "Physical Address". As the analysis continues, other chunks are collected, identified (Logical Address, FP) and FPs are compared (hereinafter referred to as FP Compare) to the stored FP. Whenever a match occurs, the redundant chunk is replaced with a small reference (instead of being redundantly stored in the storage media) that points to the previously stored chunk ("Physical Address").

Given that the same byte pattern may occur dozens, hundreds, or even thousands of times (the match frequency is dependent on the chunk size), the amount of data that must be stored or transferred can be greatly reduced. The FP, thus, acts as a kind of a unique identifier to the chunk of the data stored at the location referred by its Physical Address (e.g., the relation of a unique FP with its corresponding Physical Address hereinafter is held in a table referred to as "FP Table").

The reading (retrieving) process takes place when the user applications submit a request to read a chunk of data by specifying its location "Logical Address". As such, the system must remember whether the chunk of data at the location specified by the user application is either the location where the data resides or is only a reference to a location where the data is really stored. Such information must be kept for every available Logical Address (e.g., the unique relation between Logical address with its corresponding Physical Address or its reference hereinafter is held in a table referred to as "Address Table"). In both cases, the system is able to retrieve the chunk of data back based on the reference of or the Physical Address directly.

While writing a chunk of (possibly duplicate) data with deduplication feature appears (e.g., externally) to be a single operation, the actual underlying process involves a number of steps. In order to clearly describe the technique, some steps not directly related to the technique are not describe herein (e.g., some steps associated with all of the nitty-gritty accounting required to allocate the block in the storage, to really write the data into the allocated block in the storage and/or to modify or to free the entries of the FP Table or the Address Table are not described herein). If all the steps to write a chunk of data with deduplication are completed perfectly (and this happens most of the time), the data is saved successfully. However, if the process is interrupted at any time (e.g., perhaps due to power failure or other systemic failure), a system can end up in an inconsistent state. Corruption occurs because the logical operation of writing (or updating) a chunk of data is actually a sequence of operations and I/O, and the entire operation may not be totally reflected on the storage media at any given point in time.

Whenever a chunk of data is transformed, concerns arise about potential loss of data whenever the same data is read back. By definition, deduplication methods store data differently from how it was written or given. As a result, users, computer applications and operating systems are concerned with the integrity of the data. When the data is being read back, it is expected that the data is transformed back to the original one. As such, in many embodiments it is desirable for a deduplication enabled system to have the information in the mapping tables (hereinafter referred to as "Metadata") readily accessible and persistently stored in a way that its data is consistent and protected from any loss at any time. Metadata in such embodiments is kept persistent and local with the chunk of the data at all times. Metadata is non-user data created during the deduplication process. Metadata is the "heart" or the "glue" used to reconstruct original user data or information. In some embodiments, all metadata modifications are kept persistently in case of a catastrophic data loss. One of the more important types of metadata in deduplication are the data in Address Table and of FP Table.

Besides data corruption during transformation, other common threat of data loss during the deduplication process such as the loss of power, sudden failure from underlying systems. Even if the loss of data is small, it could be devastating for the consistency and integrity of the whole information stored in the media and will render the application unusable or give the wrong result. In some embodiments, systems that store metadata in DRAM (or other volatile/non-persistent storage media) are avoided. If metadata is stored apart from primary storage, then this must be considered in failover planning. There are also fewer issues if metadata is stored with user data.

In the storage systems of interest, storing deduplication metadata on the non-volatile storage media involves bundling metadata blocks in the same transaction as associated user data blocks. If there is any partial read of a metadata block that is not in Random Access Memory (RAM), the metadata must be read back from the media. Some other deduplication solutions require storing deduplication metadata on hard disk, and accessing the hard disk to obtain the deduplication metadata, which results in high latency.

Some other Deduplication techniques may read more metadata blocks than required, cache it in RAM to speed-up the reading process and may defer any writing request in RAM to give an impression of fast writing. However, such techniques pose a threat of data loss if the system suddenly fails and/or of data integrity issues in case the metadata cannot be fully synchronized or recovered. Even small loss or dis-integrity in metadata will render the whole information in the storage media unusable.

Another approach to mitigate the problems is to use flash based storage which persist the data while allowing low latency. However, flash based solutions do not provide high bandwidth and speed as much as RAM based solutions in case of high performance and I/O intensive operations. To make the matter worse, frequent access to the storage area in a flash based solution will quickly degrade the performance and endurance (i.e., life expectancy) of the storage media. Compounding the problem, in case of power loss or inconsistency on high capacity storage, the process of recovery takes a significant amount of time due to the large amount of metadata.

Various techniques are described herein that can handle deduplication processing and access its metadata in a fast and space efficient manner even under heavy and constant load during I/O intensive operations (e.g., writing and reading). In addition, techniques to protect the system from data loss, quick recovery and integrity of the whole metadata information in high capacity storage in case of catastrophic failure of the environment or the storage media itself are described herein. Also, ways to persistently store large amounts of metadata (high capacity storage) without significantly degrading the performance and endurance of the storage drive (life expectancy) if a flash based solution is being used are described herein.

Figure 5:
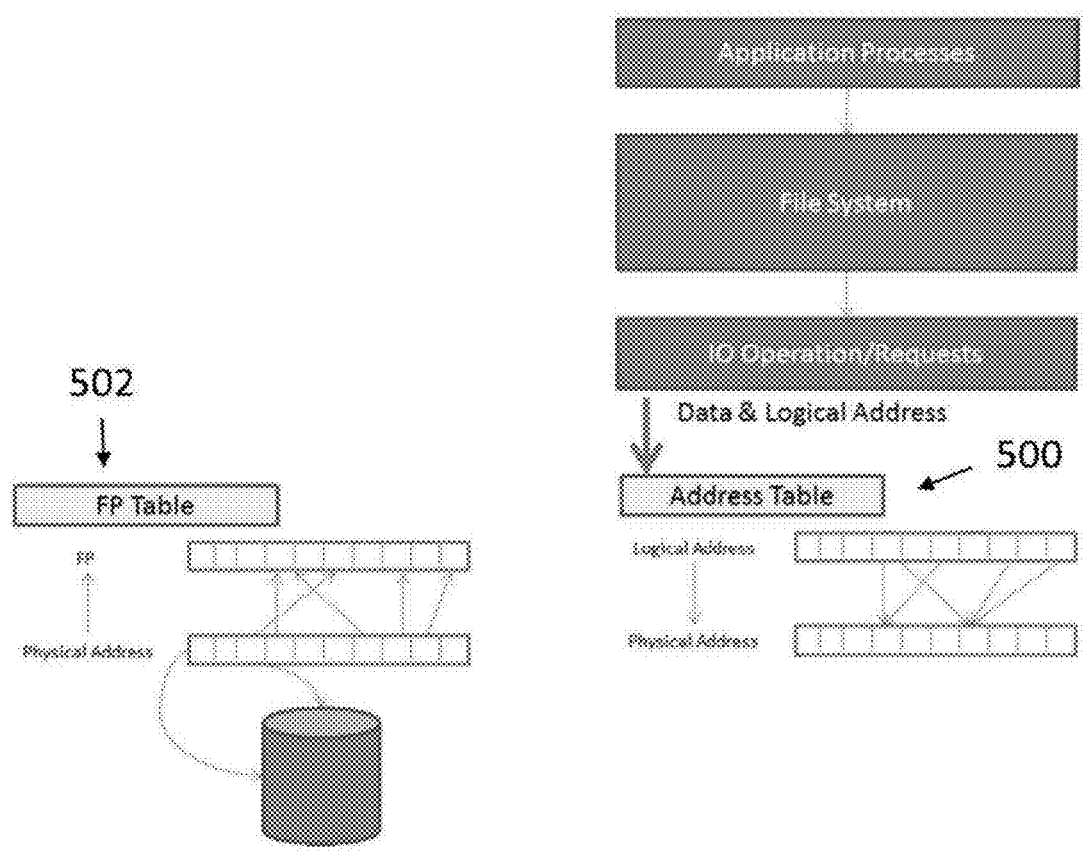

FIG. 5 shows an embodiment of two tables used by a deduplication process during a write operation. One is an Address Mapping Table 500 (hereinafter referred to as "Address Table") and the other is a Finger Printing Mapping Table 502 (hereinafter referred to as "FP Table"). Address Table 500 stores a mapping of the address of incoming chunk of data (Logical Address) to a place (Physical Address) where the data is actually stored. The FP Table 502 stores a mapping between Finger Printing (FP) and the Physical Address.

The Address Table 500 serves as a translation layer between the address, about which the application knows and the address where the data really resides in the storage media. In case of duplication of the chunk of data, multiple Logical Addresses have the same mapped Physical Address. The FP Table 502 stores the information about a chunk of data by associating its FP with the address where the chunk of data is stored in the storage media. The glue of both tables lies in the Physical Address. Any existing Physical Address in one table must exist in the other.

In this example, during a write IO Operation, which carries a Logical Address as well as the data, using two tables above, the process of deduplication starts by looking up an entry in the Address Table 500. If an entry is not found, then the chunk of data is fingerprinted using a hash function. The result of the hash function is an (almost) unique identifier (FP) which is then used to find an entry in the FP Table 502. If an entry in the FP Table 502 is not found, then the incoming chunk of data is really new and the chunk of data is stored physically. The location or address of the data is then stored together with its FP in the FP Table 502 and with its Logical Address in the Address Table 500. In the case that the FP is found in the FP Table 502, and then it is assumed that the Logical Address associated with it contains the same chunk as of the incoming data and the data is not stored (again) but its Physical Address is associated with the Logical Address in the Address Table 500.

In this example, if an entry in the Address Table 500 is found and the FP is not found, then the incoming chunk of data represents an updated data from the original chunk of data which has been stored physically. The updated data needs to be stored physically and its location or address of the data is then stored together with its FP in the FP Table 502 and with its Logical Address in the Address Table 500. Because the FP is not found but there is an entry in the Address Table 500, the entry in the Address Table 500 is not valid anymore and maybe it needs to be cleaned. The decision of being cleaned or not depends on whether the same Logical Address is referred to by any other entries the Address Table 500.

If an entry in the Address Table 500 is found and the FP is also found, then it is assumed that the Logical Address associated with it contains the same chunk data as of the incoming data (at least in this example). If the Physical Address in the FP Table matches the Physical Address in the Address Table 500, then the data is not stored (again) because it is a duplicate. If they are not the same then a case of Collision exists, which is in many implementations assumed to be almost impossible.

During a read IO Operation, the user application submits a Logical Address from which the data is to expected or believed be retrieved. Since the location of the data might have changed due to Deduplication, the Address Table 500 is used to determine the Physical Address where the location of the data really is. As can be seen above, during the IO Operations (reading and writing), the information in both tables (FP Table 502 and Address Table 500) is accessed and therefore it is desirable for the data stored therein (referred to herein as metadata) to be stored reliably and persistently.

Figure 6:
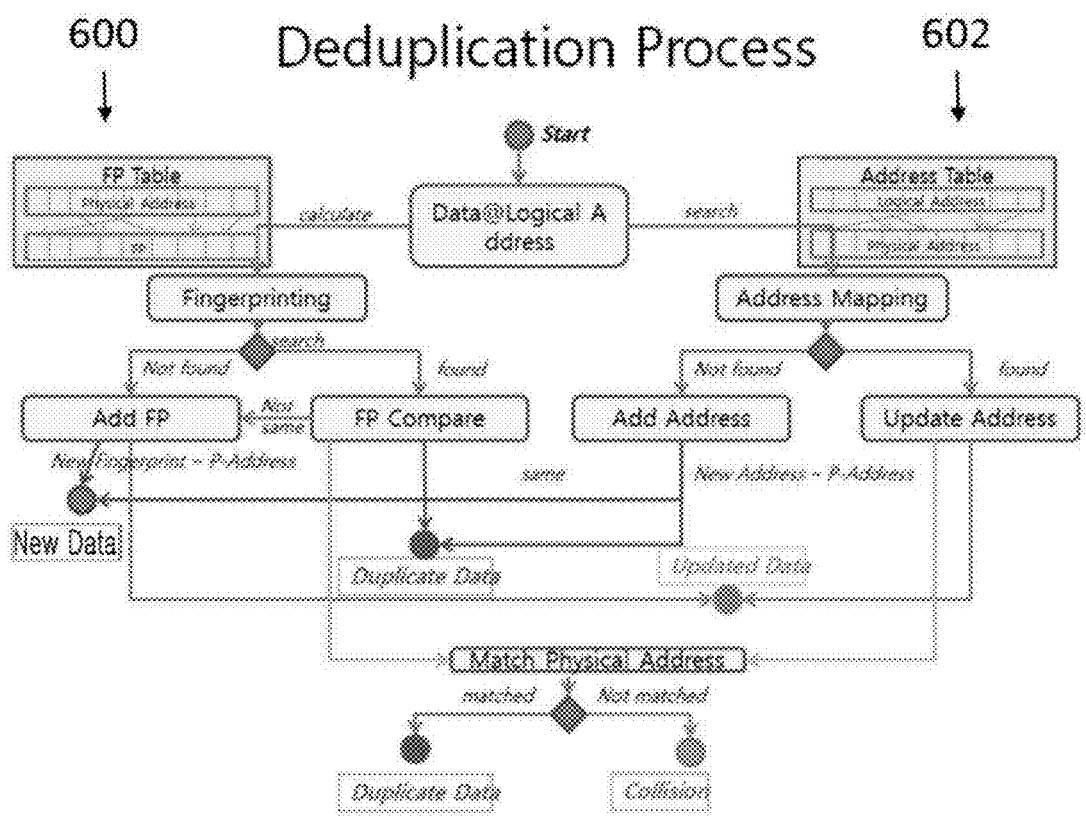
FIGS. 6, 7, 8, 9, and 10 are diagrams showing examples of deduplication in accordance with aspects of the invention.

FIG. 6 shows a high-level embodiment of a Deduplication process. Referring to FIG. 6, various embodiments for how deduplication is able to be handled for high capacity storage in a reliable and fast manner will be described. Some examples for efficiently storage, fast metadata access, and being space efficient during I/O intensive operations (writing and reading) are also described. Various embodiments to protect the system and to recover quickly from a data loss and/or to guarantee the integrity of the whole information in case of a sudden failure of the system or the failure of the storage itself is described, which is of particular interest for high capacity storage. Finally, various embodiments for storing the metadata without significantly degrading the performance and the endurance of the storage media (hereinafter referred to as "life expectancy") in case a flash based solution (such as SSD) is used is described below.

Various techniques may be used such as the following.

(1) Batch and parallel processing in Deduplication Process for performance including processing metadata journal transactions and journaling atomic operations: Use of Master and Slave paradigm to achieve consistent deduplication result. The process operating on the Address Table acts as the master and the process operating on FP Table acts as the slave. The "slave" will have the task of evaluating the incoming data and identifying the location (Physical Address) where the data (or its duplicate) is stored. Whenever the FP Table and/or Address Table are modified, the system will create journal transactions in Batch and processed asynchronously and in parallel as well.

(2) Metadata Journaling: Metadata (FP and Address Table) changes are recorded, cached and on-and-off (e.g., periodically or occasionally) are flushed into the storage media. There may be a transaction oriented process to achieve the atomicity of the journaling process. It is worthwhile to note that FP Table is a 1:1 and Address Table is a 1:N relationship. Both tables include exactly the same Physical Addresses. There is no physical address which is in the FP table but not in the Address Table and vice versa.

(3) Transparent lookup table and deferred Metadata Write: Metadata is cached using transparent lookup table in Non-Volatile RAM (such as NV-DIMM, MRAM, or ReRAM) and on-and-off are flushed into the storage media.

(4) Metadata Transaction Consolidation: For large capacity storage, the system will have a large amount of Metadata and Journal Data (e.g., data about transactions of the Metadata changes). To further save space and write efficiency, a Metadata transaction is not immediately written to the storage medium. Depending on the "final state" of the transaction, multiple transactions can cancel each other out or be combined into a single transaction which then can be stored in the storage medium.

Referring to the deduplication process depicted in FIG. 6, the left sub-process 600 and the right sub-process 602 rely on separate and different metadata (e.g., the Address Table versus the FP Table). Both sub-processes 600 and 602 can run together without interference (parallelism). To enhance the parallel processes, the queues are being used to process the data in batch. The use of queues will also open a possibility to add different types of schedulers which, depending on the nature of the data, reorder or reprioritize the pending data.

Figure 7:
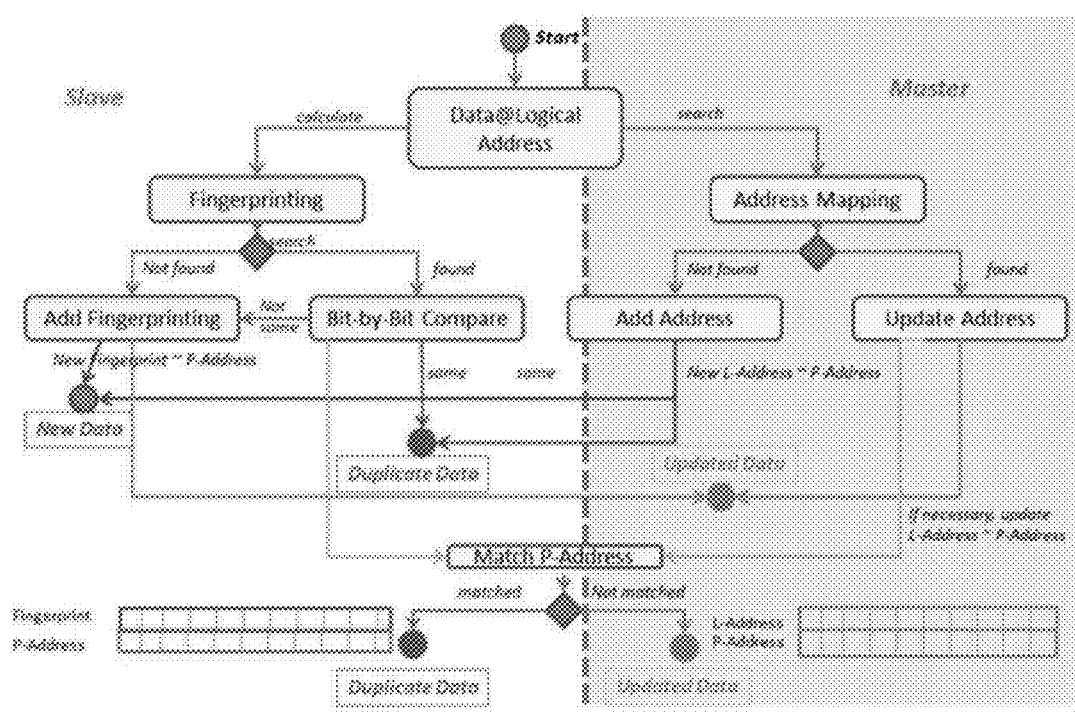

FIG. 7 illustrates an embodiment of a deduplication process where a master/slave relationship is used. Various states, state transitions, triggers, and operations are described below. There are three (3) cases (hereinafter referred to as "Final State") possible for the exemplary Deduplication process.

(1) New Data—it is the case when mapping of the Logical Address is not found and the mapping of FP is not found.

(2) Duplicate Data—there are two cases in which this can occur. First is when the mapping of the Logical Address is not found and the mapping of FP is found. Second is when the mapping of the Logical Address is found, the mapping of the FP is also found, and the mapping of both tables refer to the same Physical Address.

(3) Updated Data—there are three cases in which this can occur. First is when the mapping of the Logical Address is found but the mapping of FP is not found. Second is when the mapping of the Logical Address is found, the mapping of FP is also found, but the mapping of both tables does not refer to the same Physical Address. Third, and the most complicated route in the deduplication process, as the FP match is being made in the Slave, the original entry is either not found or different, which means the Slave needs the instruction to run garbage collection, whose decision can only be made in the Master based on the information stored in Address Table.

The importance of differentiated cases here is related to categorizing which cases will change the metadata until its final state.

In the embodiment shown in FIG. 7, the depicted deduplication process includes two concurrent processes, one running in a Master domain and the other in a Slave domain. In that example, each incoming chunk of data has to be hashed into an FP, whose entry in FP Table has to be searched in the Slave, and in the Master, whose Logical Address has to be searched. The process of Fingerprinting and finding its entry in FP Table in Slave is a resource intensive one compared to finding an entry of Logical Address in Address Table in the Master. Based on this observation, two types of queues are used (at least in this embodiment) to hold the information that is needed to be processed asynchronously by the Slave.

First, the FP queue, which contains all the information to process all necessary steps in the Slave (e.g., writer: master and slave for adding an entry into Address Table with a Physical Address, reader: slave will update the FP queue with the physical address). To accelerate even more the process, there might be more than one FP queue, but for the sake of simplicity, we describe the invention only using one queue. Any additional queue will have identical processing mechanism.

Second, the Garbage Collection Queue, which contains physical addresses whose contents are obsolete, meaning the Slave must clear its entry in the FP Table (e.g., writer: Master, reader: Slave).

Figure 8:
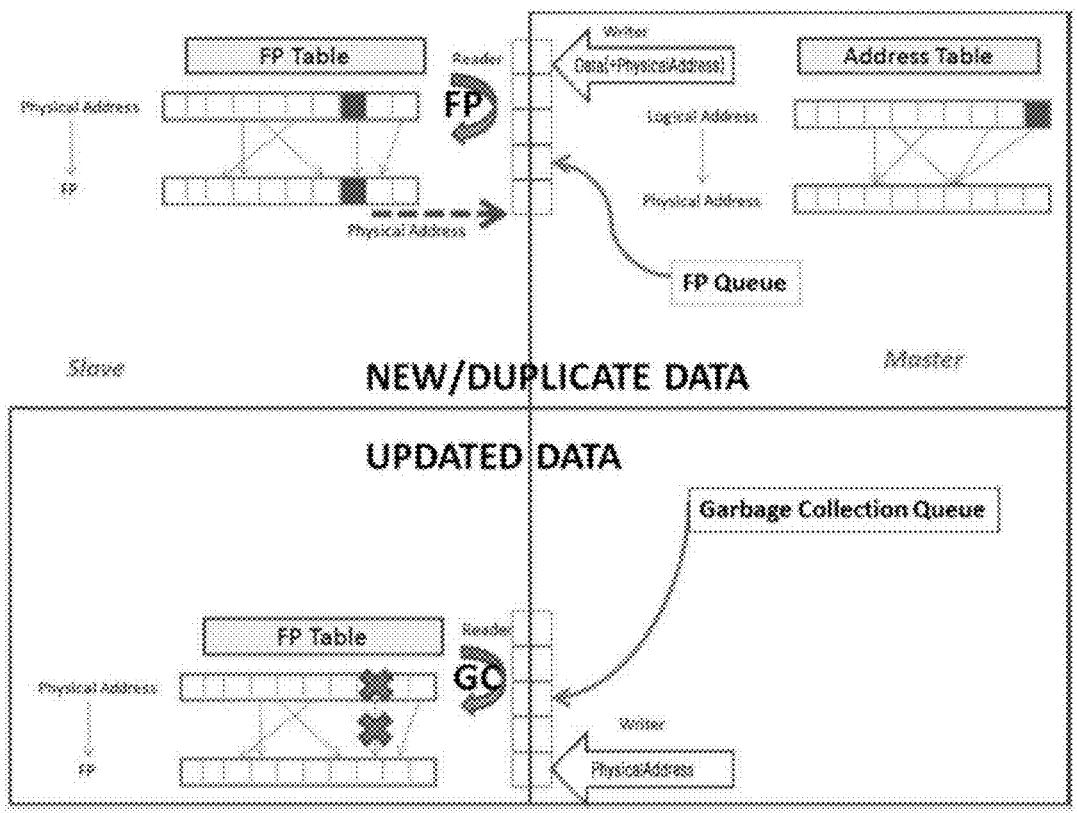

FIG. 8 shows an embodiment with new/duplicate data and updated data. As shown, the use of the queues not only enhances the system to asynchronously execute the sub-processes in parallel for performance but it also enables the retention of changes and states of the metadata for journaling. The metadata journaling process is described in detail below.

The ability to prevent Metadata loss and enable quick recovery lies in the use of transactions. A Metadata Journaling transaction treats a sequence of changes on Metadata as a single, atomic operation, but instead of tracking updates to the tables individually, the Metadata Journaling tracks changes (e.g., data and operations) to the Address Table and FP Table as a group. To put it another way, the transaction guarantees that either all or none of the Metadata updates (e.g., to Address Table and FP Table) are done. For example, the process leading to the final State "New Data" modifies the Address Table by adding a pair of a new Logical Address with its corresponding Physical Address in the Address Table and a pair of a new FP with its corresponding Physical Address in the FP Table. Before the system makes those changes, it creates a transaction that describes what it's about to do. Once the transaction has been recorded (e.g., in a persistent way), the system proceeds and modifies the Metadata (hereinafter referred to as "write-ahead logging"). The Metadata journal in the deduplication system is simply a list of transactions and can be implemented using a circular buffer. Once the transaction is persisted (hereinafter referred to as "committed"), it is not needed anymore and can be regarded as "closed" or "complete". In various embodiments, the Metadata journal can be located either internally in the storage system, or externally on a separate storage device to reduce contention for storage access.

In the event of a system failure, the system's Metadata is restored to a consistent state by replaying the Metadata journal. Rather than examine all Metadata (in the storage), the system inspects only those portions of the Metadata that have recently changed. Recovery is much faster. Better yet, recovery time is not dependent on the size of the storage media (capacity). In addition to faster restart and recovery times, the Metadata journaling systems in this way can also address another significant problem: scalability. Large capacity storage media can be combined into very large massive capacity storage and the size of the Metadata journaling will not increase at all and the recovery times are constant.

Using SSD drives for write journaling metadata can help reduce write latencies, thus improving the overall storage performance. With it though, another caveat of using journaling specifically on flash based storage media (such as SSD) is that the metadata journaling is not very suitable due to the extra (i.e., frequent) writes caused by transaction's recording. Read and Write on SSD will decrease the life span of the storage. As such, in some embodiments, a logical layer is used to transparently lookup and write the Deduplication Metadata (e.g., to/from the FP Table and Address Table). In addition to the table lookup, the layer embodies the idea of deferred write.

In summary, there are four changes which modify the metadata: adding a new entry into the FP table, adding a new entry into the address table, invalidating (deleting) an entry from the FP table, and invalidating (overwriting) an entry in the address table.

A transaction (atomic operation) consists of one or more combination of the changes above. The exact order of the changes will depend on which "Final State" the system is heading.

Regarding the Metadata Journaling Process, as application requests to write the data to the underlying storage media with its corresponding Logical Address are received, the "Master" (in the Master View) looks up in the Address Table and has two cases of concern.

Figure 9:
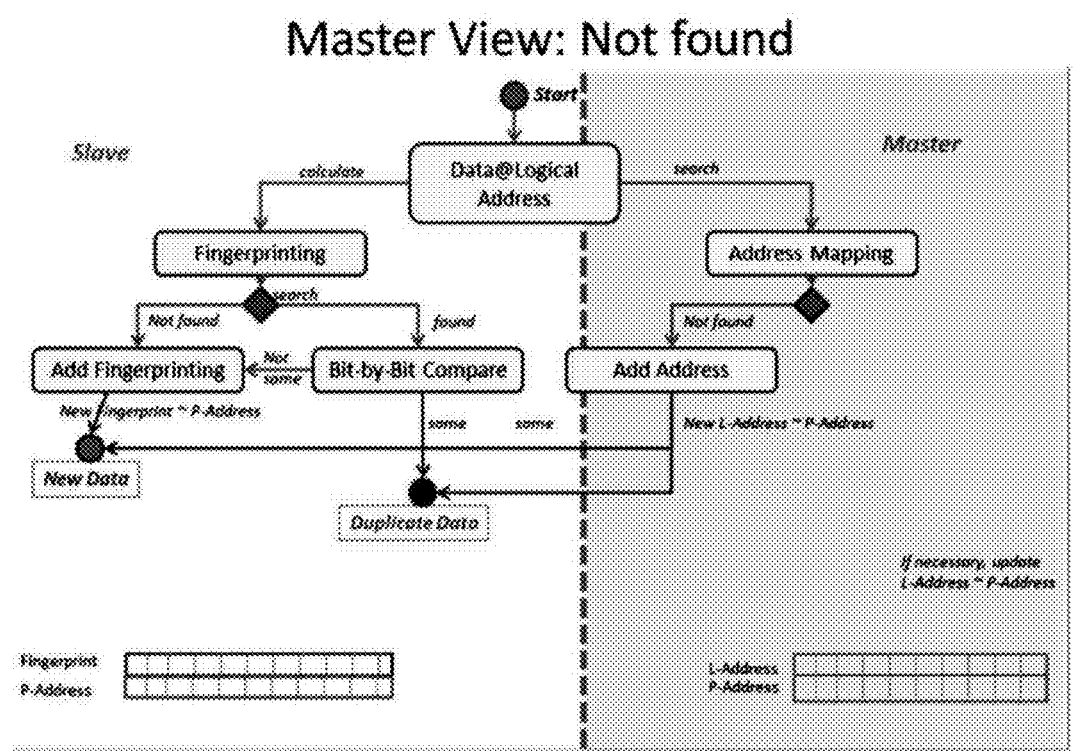

The first case is if the logical address is not found in the address table. FIG. 9 shows an embodiment of this. In this case, the Address Table will be later on added with a new entry of a pair of Logical Address and Physical Address. However, at this point the Physical Address is unknown. The "slave" is responsible to determine what the corresponding Physical Address for the incoming Logical Address is. Here, the Final State is the following: (1) New Data, if the "slave" is not able to find an entry of the FP in the FP Table. At this final state, a new entry is added into the Address Table as well as a new entry into the FP Table. (2) Duplicate Data: if the "slave" is able to find an entry of the FP in the FP Table. The final state means a new entry is added into the Address Table and nothing will change in the FP Table.

Figure 10:
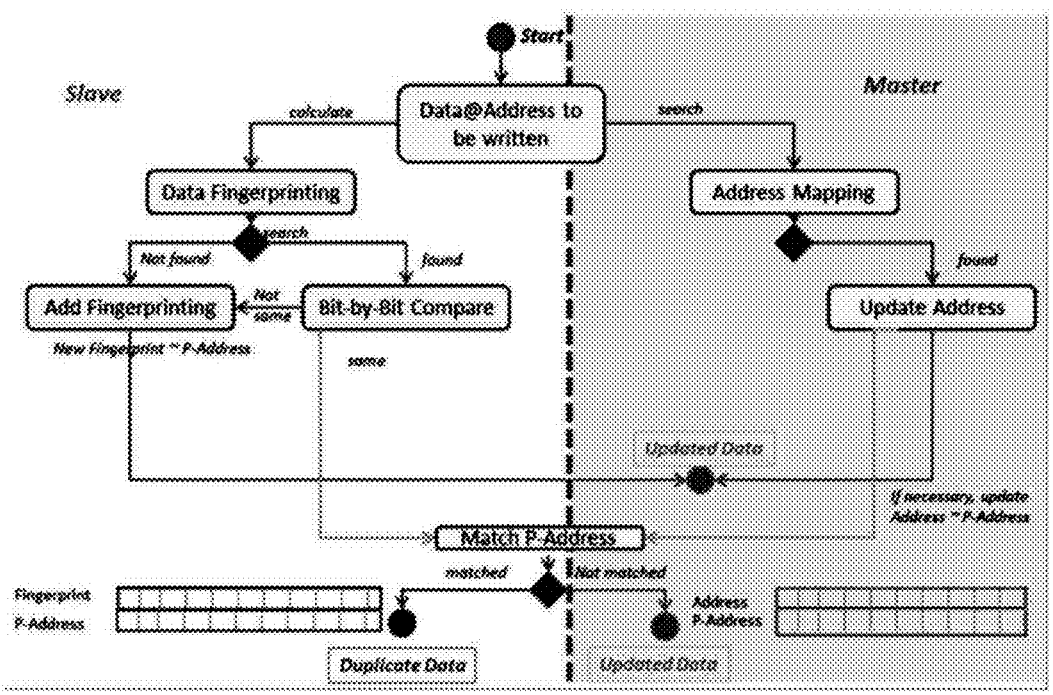

The second case is if the logical address is found in the address table. FIG. 10 shows an example of this. In this case, we know that we should not add a new entry, but there are two cases here to differentiate depending on how the "slave" determines the Physical Address. Here, the final state is the following: (1) Updated data if the "slave" is not able to find an entry of the FP in the FP table or if the "slave" is able to find an entry of the FP in the FP table but the physical address does not match the one found in the address table, such that in either situation, a new entry is added into the FP table and nothing will change in the address table. (2) Duplicate Data, if the "slave" is able to find an entry of the FP in the FP Table however the Physical Address matches the one found in the Address Table. The final state means a new entry is added into the Address Table and nothing will change in the FP Table (same as the Duplicate Data final state in the master view).

In the case where the final state is "Updated Data", it bears special attention because it represents the case of user applications updating their data, because the Logical Address has been known (meaning its entry is found in the Address Table) but its data is new (meaning its FP entry is not found in the FP Table). In this case, the "Master" has to scan the entry of Address Table to find any entry containing the original corresponding Logical Address. Once one entry with the same Logical Address is found, the Master stops scanning and the process is done. If no such entry is found, then the Logical Address is a candidate to be cleaned up (from the FP Table). The process of cleaning up FP entry from the FP Table is called Garbage Collection and it is only needed in the final state "Updated Data."

The "Slave" view is described below. There are at least two concurrent processes. Finger Printing (FP), where the Data is retrieved from the FP Queue and its hash value is calculated. The resulted identifier (FP) will be used to search the entry in FP Table. There are few cases here to differentiate. If an entry is not found and there is no Physical Address found in the FP Queue (this is the case that the "Master" does not find an entry in the Address Table), or If there is Physical Address found in the FP Queue, then it represents the final state of "Updated Data". The "slave" then allocates a new location (Physical Address) in the storage media and writes the data into it. If an entry is found and there is no physical address found in the FP queue, it represents the final state of "duplicate data." If an entry is found and there is physical address found in the FP queue, there are two cases that occur depending on whether the physical address found in the FP queue is exactly the same as the physical address found in the FP table.

If they are the same, the chunk of data has to be retrieved from the storage media and compare it bit-by-bit with the chunk of the data in the FP Queue. Here there are again two cases. If the bit-by-bit comparison is the same, then it represents the final state of "Duplicate Data". The "slave" do nothing and return the existing location (Physical Address) to the Master. If the bit-by-bit comparison is not the same, then it represents the final state of "Updated Data". The "slave" then allocates a new location (Physical Address) in the storage media and writes the data into it.

If they are not the same, then it represents the final state of "Updated Data". The "slave" then allocates a new location (Physical Address) in the storage media and writes the data into it.

Referring to Table 1, the metadata changes with regard to the final states of the deduplication process are shown.

TABLE 1

| Final State | Address Table | | FP Table | |
| --- | --- | --- | --- | --- |
| | Add | Overwrite | Add | Invalidate |
| New Data | YES | NO | YES | NO |
| Duplicate Data | YES | NO | NO | NO |
| Updated Data | NO | YES | YES | Maybe |

Based on the Table 1, an on-storage format (it is the physical layout of the data in the storage media) for the metadata journaling is defined.

Figure 11:
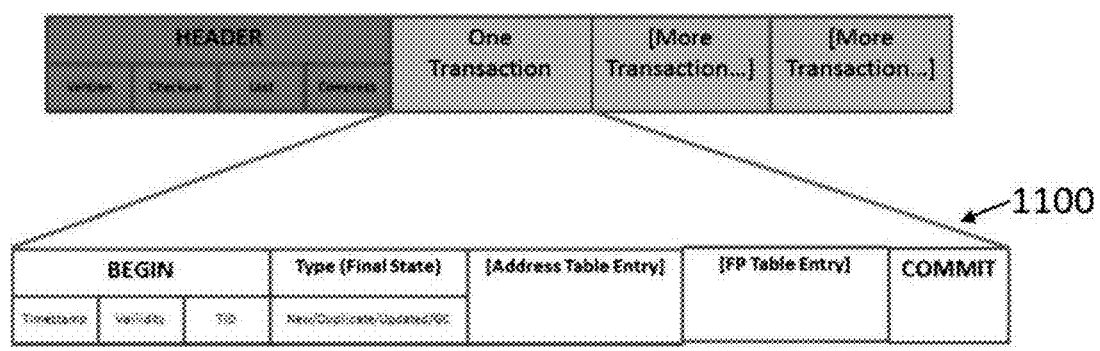
FIG. 11 is a diagram of a transaction according to aspects of the invention.

FIG. 11 shows an embodiment of an on-storage metadata journal format in accordance with examples of the invention. In this example, the content of Address Table Entry is a pair of Virtual Address and Physical Address and of FP Table Entry is a pair of Physical Address and FP. However, dependent on the Final State, some of the fields are optional and can be left empty.

As soon as a change is about to be made in the metadata, a new transaction 1100 (e.g., with a unique sequential ID/TID) is created and all the information that is going to be changed is recorded. If the transaction 1100 is successfully written on the storage media later on, the "COMMIT" flag is set indicating that all changes are safely stored in the persistent media and the field can be reused to record another transaction. After a crash or failure, recovery simply involves reading the metadata journal from the storage media and replaying changes from this journal until the metadata is consistent again. The changes are thus said to be atomic (not divisible) in that they either succeeded (succeeded originally or are replayed completely during recovery), or not replayed at all (are skipped because they had not yet been completely written to the journal before the crash occurred, which is indicated by a missing "COMMIT" flag.

One of the problems with continuously (over)writing the metadata in the storage media for flash based storage is the fact that the process will wear the media very quickly. Frequent table access will degrade the performance and endurance of flash drives. Another issue is the latency to read the metadata journal back from the media. Flash based storage media usually does not provide high bandwidth as Random Access Memory (RAM), however RAM is volatile and data could not be recovered after a power failure or crash. In order to alleviate the above mentioned issues, in some embodiments a logical layer for transparent lookup tables (metadata) and deferring writing process to the storage media is used.

In various embodiments, one or more of the following enable transparent lookup table with a logical layer: Store the metadata in a Non-Volatile RAM (hereinafter referred to as "NV-RAM"), Metadata is stored in Non-Volatile RAM and made transparent to CPU and system RAM, NV-RAM could be NV-DIMM, MRAM, ReRAM, phase-change memory and racetrack memory or even battery backed up DIMM, NV-RAM has DRAM speed and non-volatile characteristics, A back up of metadata is stored in the storage media (a backup metadata consists of all committed metadata), and/or Metadata (Address and FP Table) can be flushed to the storage media if it gets too large to be held in NV-RAM (in this case the layer provides a cache functionality for the metadata).

Figure 12:
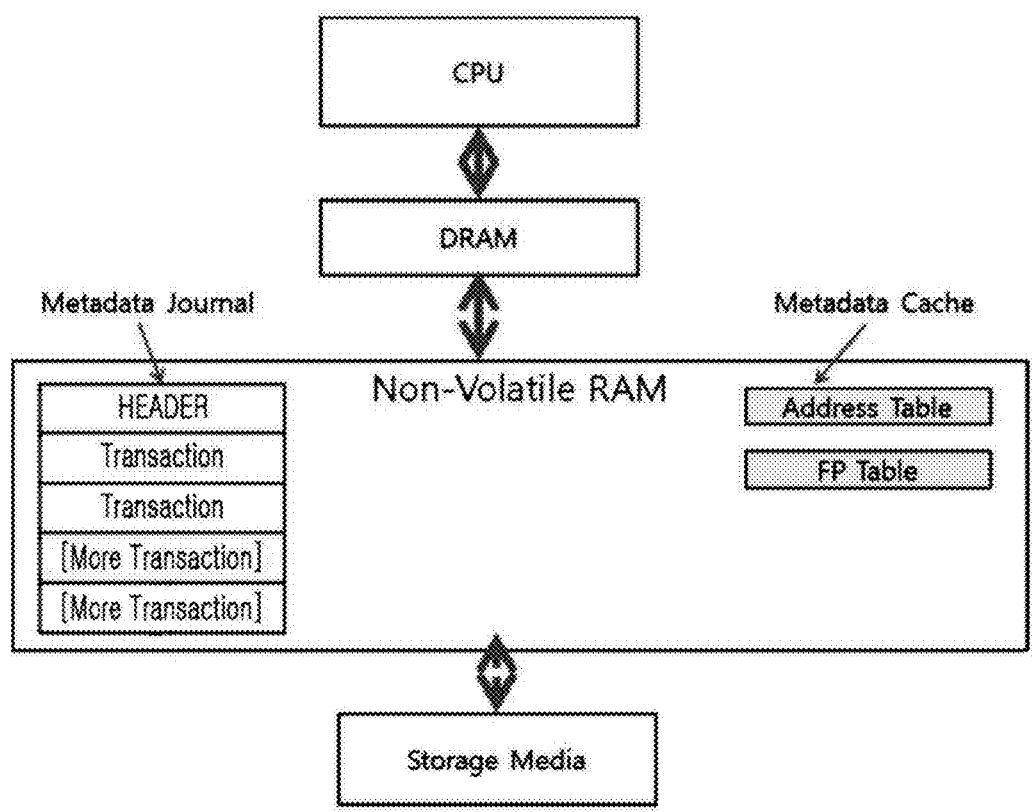
FIGS. 12, 13, 14, and 15 are diagrams showing a deduplication and recovery process in accordance with aspects of the invention.

FIG. 12 shows an embodiment of a logical layer for transparent lookup tables. In this embodiment, the read operation includes looking up the metadata in NV-RAM and, after mapping the metadata, everything is the same normal read.

Figure 13:
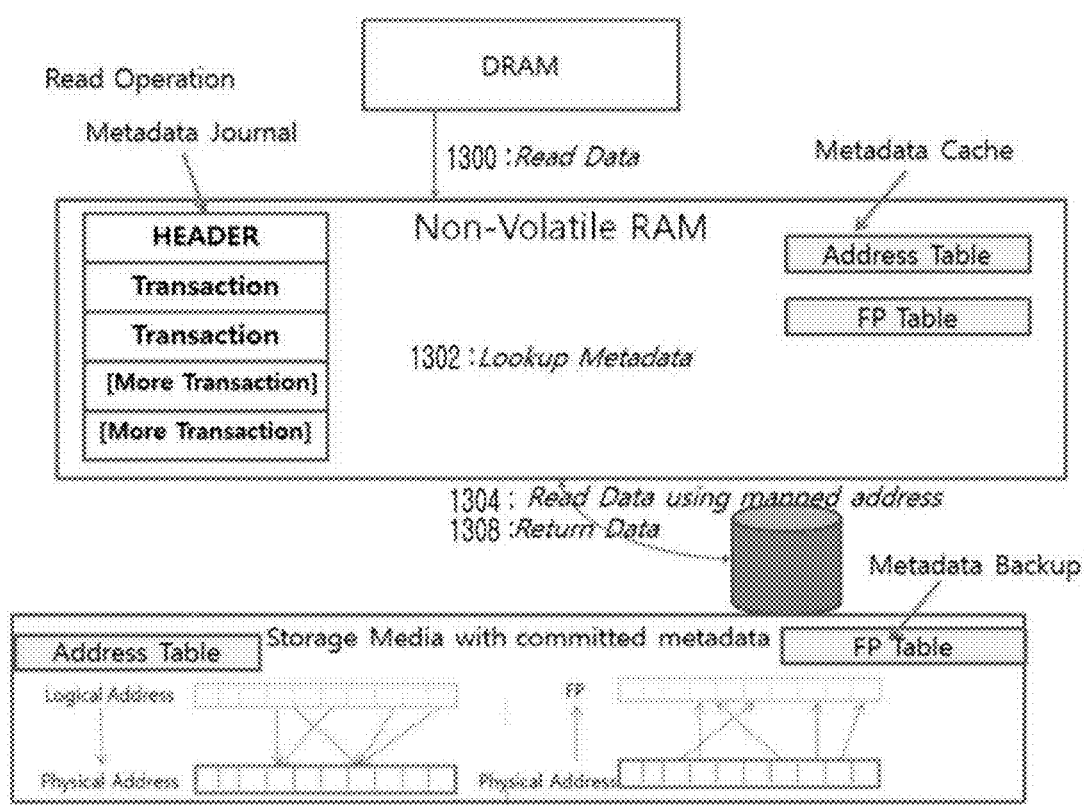

FIG. 13 shows an embodiment of a read using a logical layer. At a first step 1300, a data read operation is initiated. The read operation may be initiated by a controller or other device suitable for initiating the operation. At a second step 1302, the operation looks up the metadata in order to identify whether a duplicate exists. If duplicate data exists, at step 1304, the data is read using the mapped address. At step 1308, the data is returned.

Figure 14:
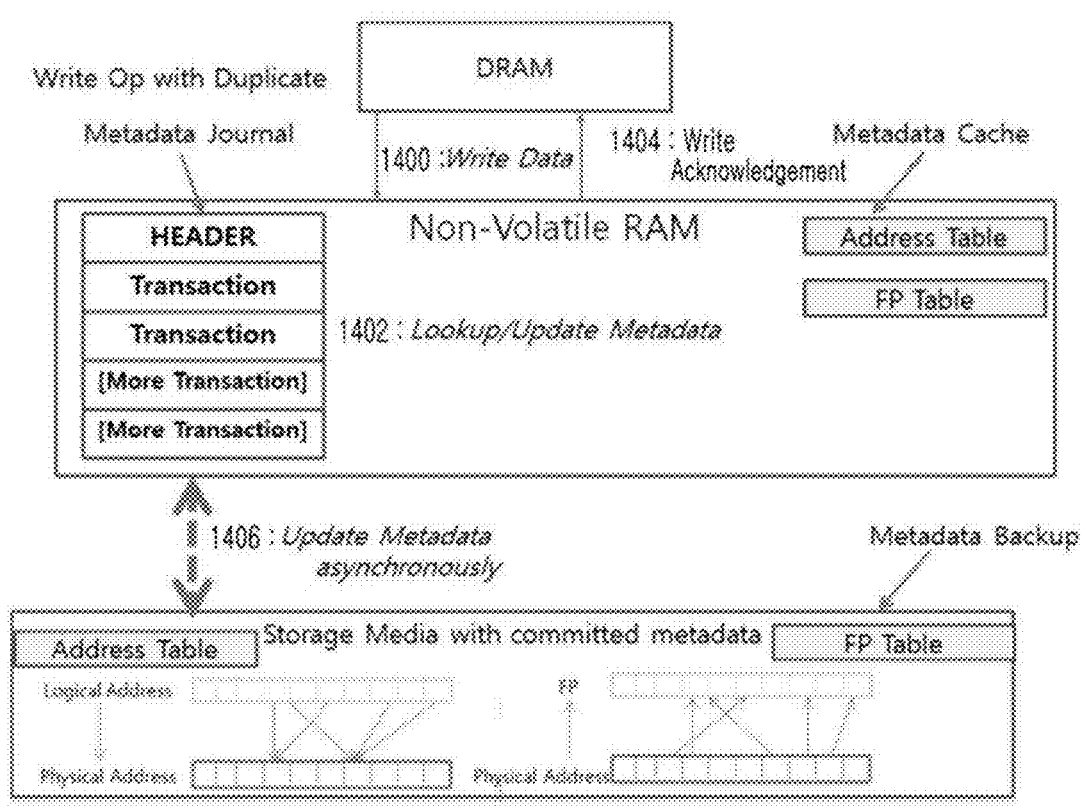

FIG. 14 shows an embodiment of a write with supplication using a logical layer. At step 1400, the data write operation is initiated. At step 1402, the operation looks up and/or updates the metadata. If no duplicate is found for the write, the write to the storage will proceed. If duplicate data is found, the metadata will be updated. At step 1404, the write is acknowledged from the drive. When the write is acknowledged from the drive, the metadata will confirm the write and also commit the metadata into the journal metadata. The journal metadata may be used to recover data if the NV-RAM fails. At step 1406, the metadata may be updated asynchronously.

Figure 15:
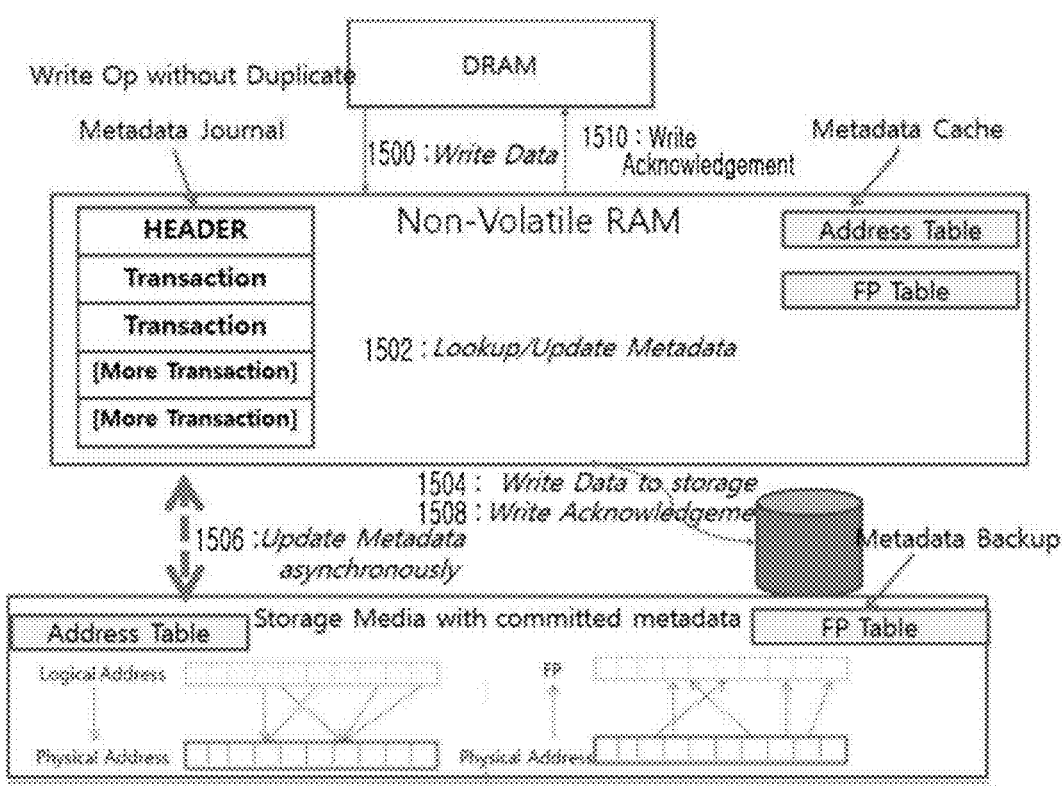

FIG. 15 shows an embodiment of a write without duplication using a logical layer. A step 1500, the write command is initiated. At step 1502, the metadata is looked up and/or updated. At step 1504, the data is written to the storage and at step 1506, the metadata is updated asynchronously. At step 1508, the write is acknowledged from the storage media. At step 1510, the write is acknowledged from the NV-RAM.

The transactions on Metadata at some point have to be persisted to the storage medium. To achieve high bandwidth, efficient use of space and to extend the life span of flash based storage, it is desirable to write the metadata as completely, actually persist as few as possible. In order to achieve both goals, in some embodiments deferred and consolidated transactions via asynchronous write are used. Depending on the "final state", there may be transactions which either cancel out another transaction or can be combined together into one single final transaction.

On the final states which modifies Address Table: The last transaction with a specific Logical Address will cancel out all the preceding transactions with the same Logical Address.

On the final states which modifies the FP Table: The last transaction with a specific Physical Address will cancel out all the previous transactions with the same Physical Address.

Figure 16A:
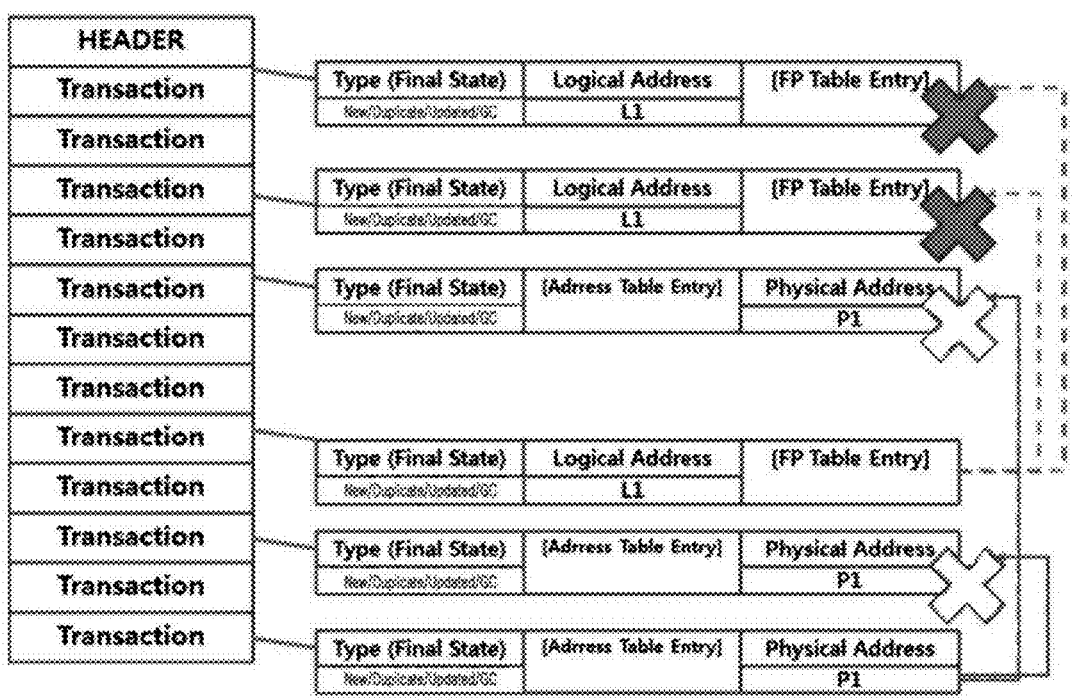
FIGS. 16A and 16B are diagrams showing write consolidation on metadata in accordance with aspects of the invention.
Figure 16B:
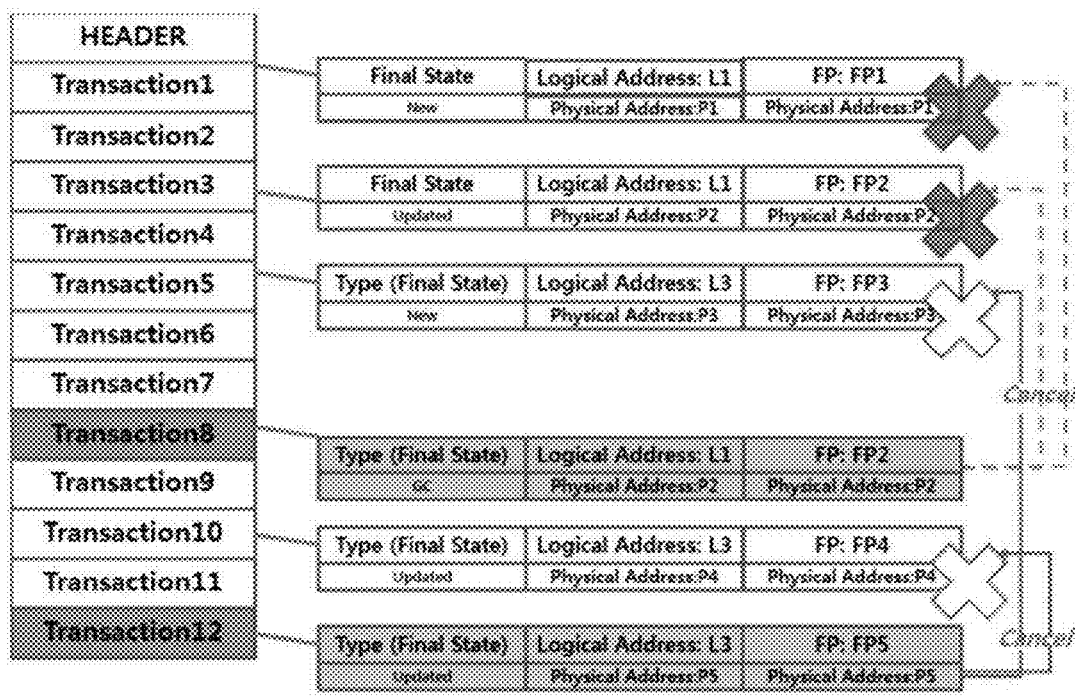

FIGS. 16A and 16B show some embodiments of write consolidation. Referring to FIG. 16E, Transaction8 will cancel out. Transaction1 and Transaction3 because each transaction refers to Logical address L1. Only The last transaction counts, because the previous ones (Transaction1 and Transaction3) are NOT valid anymore to represent the deduplication metadata for any information stored under L1. Furthermore, Transaction8 is a 'GC' (Garbage Collection/Cleaning Up) final state, meaning, there is nothing that should be stored. The previous transactions just happen to be transitionary.

Transaction12 will cancel out Transaction10 and Transaction5, because each transaction refers to Logical address L3. Only The last transaction counts, because the previous ones (Transaction10 and Transaction5) are NOT valid anymore to represent the deduplication metadata for any information stored under L3. At the end, only Transaction12 is needed to be recorded.

While the present invention has been particularly shown and described with reference to exemplary embodiments thereof, it will be understood by those of ordinary skit in the art that various changes in form and details may be made therein without departing from the spirit and scope of the present invention as defined by the following claims. Thus, the foregoing is by way of example only and is not intended to be limiting. For example, any numbers of elements illustrated and described herein are by way of example only. The present invention is limited only as defined in the following claims and equivalents thereof.

What is claimed is:

1. A memory system for utilizing a deduplication process, comprising:
    a controller;
    a storage media; and
    a non-volatile RAM including a metadata journal and a metadata cache;
    wherein the metadata cache includes an address table and a fingerprinting table;
    wherein the address table and the fingerprinting table are searched in parallel for incoming data chunks and are modified in parallel and in accordance with the searches, each incoming data chunk being categorized as one of new data, duplicate data and updated data, a select incoming data chunk being categorized as:
        new data when the select incoming data chunk is not identified in either the fingerprinting table or the address table,
        duplicate data when a fingerprint for the select incoming data chunk is found in the fingerprinting table and either no logical address for the select incoming data chunk is found in the address table or a logical address for the select incoming data chunk is found in the address table in which case the logical address and the fingerprint map to a same physical address in the address and fingerprinting tables respectively, and
        updated data when a logical address for the select incoming data chunk is found in the address table and either no fingerprint for the select incoming data chunk is found in the fingerprinting table or a fingerprint for the select incoming data chunk is found in the fingerprinting table in which case the fingerprint and the logical address do not map to a same physical address in the fingerprinting and address tables respectively; and
    wherein the metadata journal includes a plurality of transactions that reflect modifications to the address table and the fingerprinting table, each of the plurality of transactions indicating a result of a deduplication process performed on a corresponding incoming data chunk including its categorization as one of new data, duplicate data or updated data.

2. The memory system of claim 1, wherein each of the plurality of transactions includes a commit portion.

3. The memory system of claim 2, wherein the commit portion includes a flag indicating that the corresponding transaction is successfully written on the storage media.

4. The memory system of claim 1, wherein the plurality of types of data includes data marked for garbage collection.

5. A method for utilizing a deduplication process, comprising:
    storing an address table and a fingerprinting table as a metadata cache on a non-volatile RAM;
    performing searches on the address and fingerprinting tables in parallel for incoming data chunks;
    categorizing each incoming data chunk as one of new data, duplicate data and updated data, a select incoming data chunk being categorized as:
        new data when the select incoming data chunk is not identified in either the fingerprinting table or the address table,
        duplicate data when a fingerprint for the select incoming data chunk is found in the fingerprinting table and either no logical address for the select incoming data chunk is found in the address table or a logical address for the select incoming data chunk is found in the address table in which case the logical address and the fingerprint map to a same physical address in the address and fingerprinting tables respectively, and
        updated data when a logical address for the select incoming data chunk is found in the address table and either no fingerprint for the select incoming data chunk is found in the fingerprinting table or a fingerprint for the select incoming data chunk is found in the fingerprinting table in which case the fingerprint and the logical address do not map to a same physical address in the fingerprinting and address tables respectively;

writing a transaction, among a plurality of transactions in a metadata journal, each transaction reflecting a modification to at least one of the address table and the fingerprinting table and indicating the result of a deduplication process performed on a corresponding incoming data chunk including its categorization as one of new data, duplicate data or updated data; and updating, on the non-volatile RAM, the metadata journal, the address and fingerprinting tables being modified in parallel in accordance with the searches.

6. The method of claim 5, wherein each of the plurality of transactions includes a commit portion.

7. The method of claim 6, wherein the commit portion includes a flag indicating that the corresponding transaction is successfully written on the storage media.

8. The method of claim 5, wherein the plurality of types of data includes data marked for garbage collection.

9. An apparatus, comprising:

a memory controller suitable for use in a non-volatile RAM including a metadata journal and a metadata cache;

wherein the metadata cache includes an address table and a fingerprinting table;

wherein the address table and the fingerprinting table are searched in parallel for incoming data chunks and are modified in parallel and in accordance with the searches, each incoming data chunk being categorized as one of new data, duplicate data and updated data, a select incoming data chunk being categorized as:

new data when the select incoming data chunk is not identified in either the fingerprinting table or the address table, duplicate data when a fingerprint for the select incoming data chunk is found in the fingerprinting table and either no logical address for the select incoming data chunk is found in the address table or a logical address for the select incoming data chunk is found in the address table in which case the logical address and the fingerprint map to a same physical address in the address and fingerprinting tables respectively, and updated data when a logical address for the select incoming data chunk is found in the address table and either no fingerprint for the select incoming data chunk is found in the fingerprinting table or a fingerprint for the select incoming data chunk is found in the fingerprinting table in which case the fingerprint and the logical address do not map to a same physical address in the fingerprinting and address tables respectively; and wherein the metadata journal includes a plurality of transactions that reflect modifications to the address table and the fingerprinting table, each of the plurality of transactions indicating a result of a deduplication process performed on a corresponding incoming data chunk including its categorization as one of new data, duplicate data or updated data.

10. The apparatus of claim 9, wherein each of the plurality of transactions includes a commit portion.

11. The apparatus of claim 10, wherein the commit portion includes a flag indicating that the corresponding transaction is successfully written on a storage media.

12. The apparatus of claim 9, wherein the plurality of types of data includes data marked for garbage collection.

* * * * *